July 2, 1968    D. L. WHITEHEAD    3,391,243
ENCLOSED ELECTRIC POWER TRANSMISSION CONDUCTOR
Filed July 26, 1965    3 Sheets-Sheet 1

WITNESSES
Theodore F. Wrobel
James F. Young

INVENTOR
Daniel L. Whitehead
BY
Clement L. McHale
ATTORNEY

United States Patent Office 3,391,243
Patented July 2, 1968

3,391,243
ENCLOSED ELECTRIC POWER TRANSMISSION CONDUCTOR
Daniel L. Whitehead, Franklin Township, Export, Pa., assignor to Westinghouse Electric Corporation, Pittsburgh, Pa., a corporation of Pennsylvania
Filed July 26, 1965, Ser. No. 474,799
4 Claims. (Cl. 174—28)

ABSTRACT OF THE DISCLOSURE

This invention relates generally to transmission systems and, more particularly, to systems for transmitting high voltage electric power. More particularly, dielectric filled pipes or tubes are utilized as containers for power conductors which are supported by spaced disc type insulators along the pipes with three-phase structures having the conductors either in a coaxial or triangular configuration. Resilient conducting material or a metal spring may be provided between each insulator and the enclosing pipe to prevent corona.

---

At present, it is customary to transmit large quantities of electric power over long distances by means of aerial transmission lines. This method of transmission causes many problems. The lines are exposed to the action of the elements. Contamination, rain, wind, ice, lightning and mechanical hazards all contribute to sparkovers and subsequent power outages. Population growth and land usage make it difficult and expensive to acquire right-of-ways for high voltage lines. Corona and interference are common. Sabotage and bombing could cause interruptions during a war.

U.S. Patent No. 2,173,717 issued Sept. 19, 1939, describes a system of power transmission in which the parts subjected to high voltage, such as the windings of the generators and transformers, and the interconnecting cables, switches, etc. are enclosed by suitable metallic casing means containing a gas under superatmospheric pressure. Other patents, such as the Cooper Patent 2,221,-671 and the Rossman Patent 1,753,219, disclose a gas-filled cable or an oil-filled pipe containing an electrical conductor. However, the teachings of the prior art do not contain solutions for all of the problems involved in providing a high voltage power transmission system suitable for installing underground.

An object of this invention is to provide for supporting a conductor inside a pipe by means of an insulator constructed to make a nearly uniform voltage gradient between the conductor and the pipe, thereby increasing the voltage required for sparkover.

Another object of the invention is to preclude air gaps between the insulator and the conductor and between the insulator and the pipe, thereby preventing corona which would reduce the breakdown strength in the insulator region.

Still another object of the invention is to take care of thermal expansion of the conductors disposed inside the pipes.

A further object of the invention is to provide electrical connectors which serve as expansion joints as well as connecting individual sections of conductors together.

A still further object of the invention is to provide for connecting a relatively short section of conductor having an insulator secured thereto between two other sections of conductor.

Another object of the invention is to provide a new and improved arrangement of three isolated phase conductors enclosed in a single pressure pipe in a manner to reduce the losses associated with the high impedance zero-sequence return paths of separate pressure pipes.

A further object of the invention is to provide for the free passage of an insulating medium around the three isolated phase conductors in a manner to preclude the possibility of a fault in one phase spreading to the other two phases.

Other objects of the invention will be explained fully hereinafter or will be apparent to those skilled in the art.

In accordance with the invention, pipes or tubes are utilized as containers for power conductors which are supported by insulators of a disc type spaced along the pipes. Each insulator has a greater cross section near the conductor to make a nearly uniform voltage gradient between the conductor and the pipe. The pipes are preferably filled with a gas, such as air, carbon dioxide $CO_2$, sulfur hexafluoride $SF_6$, nitrogen and others, or a mixture of these, under pressure. In three-phase systems, each phase conductor may be in a separate pipe or all three conductors may be in one pipe in either a coaxial arrangement or in triangular configurations. In one triangular arrangement, all three conductors are enclosed in a single pressure pipe which is at ground potential and also each conductor is enclosed in a separate cylinder of relatively light conducting material which is electrically connected to the outside pressure pipe, thus making the thre cylinders at ground potential. If the insulators are porcelain, each one may be attached to the conductor, by an epoxy seal or by a filler of conducting material to prevent corona. If plastic material is used for the insulators, each one may be cast on a short section of conductor which may then be connected between two other conductor sections by connectors which serve as expansion joints. Resilient conducting material or a metal spring may be disposed between the outer rim of the insulator and the enclosing pipe to prevent corona at the joint between the insulator and the pipe wall.

For a better understanding of the nature and objects of the invention, reference may be had to the following detailed description, taken in conjunction with the accompanying drawing, in which.

Figure 1:
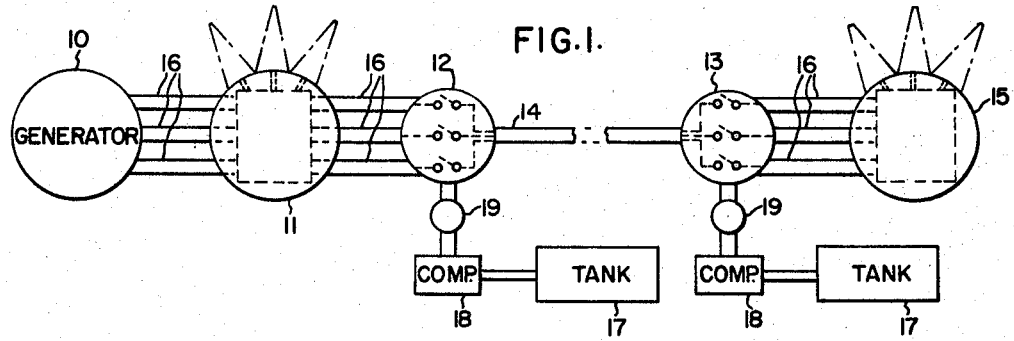
FIGURE 1 is a diagrammatic view of an electrical power transmission system embodying features of the invention.

Referring to the drawings, and particularly to FIG. 1, the electric power transmission system shown therein comprises a generator 10, a step-up transformer 11, circuit breakers 12 and 13 which are connected by a high voltage transmission line 14, and a step-down or distribution transformer 15. As shown, the power system is a three-phase system, however, other systems, such as a single-phase system or a direct current system may be utilized if desired. Since the transformer 11 is relatively close to the generator 10, each phase conductor between the generator and the transformer may be enclosed in a separate housing 16. Likewise, the phase conductors between the transformer 11 and the circuit breaker 12, and the conductors between the circuit breaker 13 and the transformer 15 may be enclosed in separate housings 16. The conductors for the three-phase transmission line 14 are preferably enclosed in a single housing for reasons which will be explained more fully hereinafter.

In order to reduce the size of the apparatus housings and the clearances necessary for high voltage service, the housings are filled with an insulating or dielectric fluid at a pressure above atmospheric pressure. The fluid may be either a liquid or a gas. Oil may be utilized as the insulating fluid. However, gases such as air, $CO_2$, $SF_6$, nitrogen or various mixtures of these gases have certain advantages for this type of power transmission. Sulfur hexafluoride, $SF_6$, gas is particularly suitable in view of its relatively high dielectric constant. Thus, satisfactory results can be obtained with $SF_6$ at pressures ranging from 0 p.s.i. gauge to 150 p.s.i. gauge depending upon the operating voltage. Very high pressures, such as 600–700 p.s.i. proposed in prior patents present a very real explosion hazard and require relatively heavy enclosures to withstand the high pressure. Boiler code restrictions would make the high pressures prohibitive in many areas. In contrast, the pressures which are proposed in the present system are comparable to pressures used in automobile and truck tires and have no such restrictions. As shown in FIG. 1, the dielectric fluid may be stored in tanks 17, compressed by compressors 18 and supplied to the transmission system through valves 19.

The housings for enclosing the power conductors are preferably sections of rigid metal pipe, although other materials may be utilized if desired. For long lines, the pipe sections may be welded together in the same manner as long gas transmission lines. Modern techniques of manufacturing and laying such lines have reduced their cost considerably.

Figure 2:
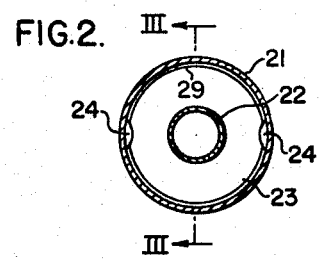
FIG. 2 is a view, in cross section, of a single phase conductor supported by an insulator inside a separate pipe.
Figure 3:
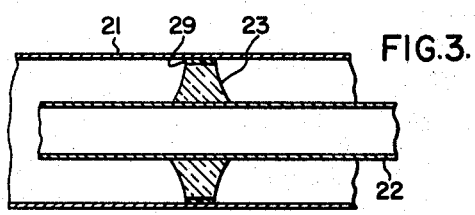
FIG. 3 is a view, in longitudinal section, taken along the line III—III in FIG. 2.

As shown in FIGS. 2 and 3, a metal pipe 21, which is generally cylindrical in shape, contains a hollow cylindrical conductor 22 which is supported inside the pipe by insulators 23, only one of which is shown, disposed along the conductor 22. The insulators 23 are preferably of a disc type, each insulator having a greater cross section near the conductor than it has near the pipe in order to make the voltage gradient more nearly uniform between the conductor and the pipe, thereby increasing the voltage required for sparkover. Since the voltage gradients are higher at the conductor and lower at the grounded pipe, the tapered disc insulator makes the voltage gradient more uniform between the conductor and the pipe.

In order to permit distribution of the insulating fluid throughout the pipe 21, recesses 24 are provided in the outer rim of each insulator 23. Thus, the fluid can flow through the pipe even though the outer diameter of each insulator is only slightly less than the inside diameter of the pipe.

Another point that is critical in the insulator structure is at the contact between the insulator and the conductor and between the insulator and the pipe. Although these clearances can be minimized, the mechanics of assembling the line normally require some clearance in order to get the conductor into the pipe. These gaps being in series with the insulator which normally has a specific inductive capacity or dielectric constant considerably higher than the insulating gas or liquid, means that the stress across the small gaps will be high which, in turn, will in many cases exceed the critical breakdown voltage for the insulating medium, thereby producing corona and consequently reducing the breakdown strength in the insulator region. There are two basic means for overcoming this difficulty. (I) Fill the gap with dielectric material to effectively provide capacitance grading. (II) Fill the gap with a conducting material so that the gap region will assume the same potential as the pipe or the conductor.

Figure 6:
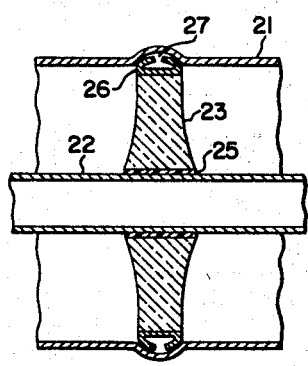
FIG. 6 is a view in longitudinal section, of one way of attaching an insulator to a conductor and retaining the insulator in the enclosing pipe.

As shown in FIG. 6, the insulator 23, which may be composed of porcelain or other good insulatnig material, is attached to the conductor 22 by means of an epoxy resin sealing material 25. A generally semi-circular metal spring shield 26 is attached to the outer rim of the insulator 23. The spring 26 is disposed in a circumferential outwardly extending groove 27 formed in the pipe 21. The conductor 22 may be inserted into the pipe by compressing the circular spring shield 26 which snaps into position when it reaches the groove 27. The spring is sufficiently resilient to absorb any movement of the conductor due to expansion. The spring 26 mantains good contact with the pipe 21, thereby preventing corona at the joint between the insulator and the pipe.

Figure 8:
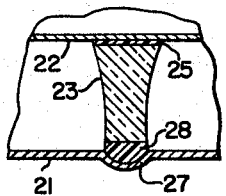
FIG. 8 is a detail view of another way of retaining the insulator in the pipe.

As shown in FIG. 8, a conducting resilient material, such as carbon filled neoprene or similar material may be utilized as shown at 28 in place of the spring 26. A rim of similar resilient conducting material 29 may be attached to the outer perimeter of the insulator 23 to engage the pipe 21 in the structure shown in FIG. 3.

Figure 7:
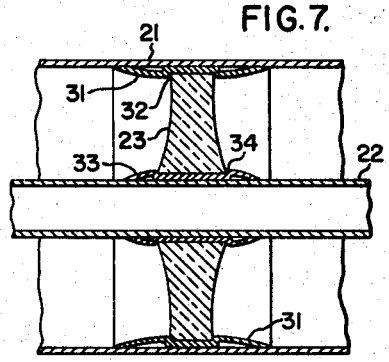
FIG. 7 is a view, similar to FIG. 5, of another way of retaining the insulator on the conductor and in the pipe.

Another solution to the problem is shown in FIG. 7 wherein the insulator 23 has a reasonably loose fit inside the pipe 21 and the air gap between the insulator and the pipe 21 is shielded with a metal ring 31 having a recess 32 therein for receiving the outer rim of the insulator. Likewise, a metal ring 33 having a recess 34 therein is disposed in the opening in the insulator through which the conductor 22 extends, thereby shielding the air gap between the conductor and the insulator. As described in a copending application, Ser. No. 474,774, filed July 26, 1965, by D. F. Shankle and L. A. Kilgore which issued June 6, 1967 as U.S. Patent 3,324,272 and is assigned to the same assignee as the present application, placing the insulator down in a slot or recess minimizes the high gradients at the edge of the insulator junction with the conductor thereby preventing corona at this point. The friction between the resilient metal rings and the pipe 21 and the conductor 22 retains the insulator 23 in position.

Figure 4:
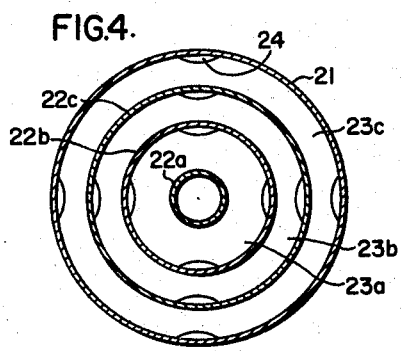
FIG. 4 is a view, in cross section, of one arrangement of three phase conductors inside a pipe.
Figure 5:
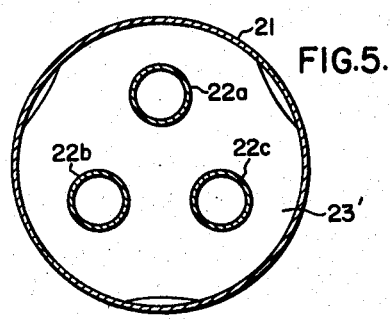
FIG. 5 is a view, in cross section, of another arrangement of three phase conductors inside a single pipe.

As explained hereinbefore, it is desirable to place all three conductors inside a single pipe housing when the transmission line is of a relatively great length. FIG. 4 shows a coaxial arrangement with three phase conductors 22a, 22b and 22c, concentrically located inside the pipe 21 and separated by ring type insulators 23a, 23b and 23c. In FIG. 5, the three phase conductors are arranged in a triangular configuration and supported by insulators 23' each one of which has three holes therein for receiving the conductors. Although the supporting insulators are somewhat more complicated for the triangular spacing, there are some advantages to this arrangement as compared with the coaxial arrangement. The overall pipe size for a given voltage is smaller and no transpositions are required with the triangular arrangement.

Figure 15:
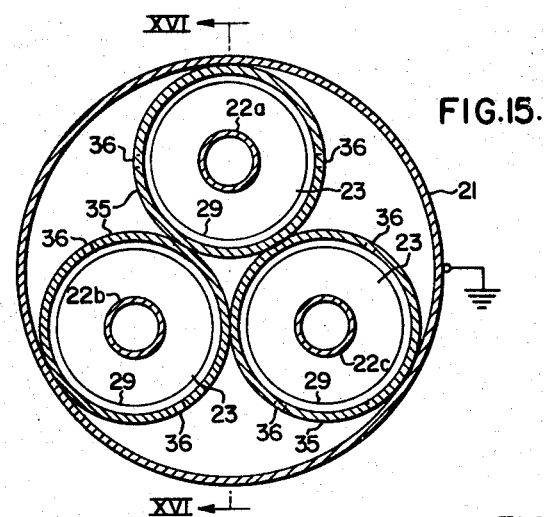
FIG. 15 is a view, in cross section, of a modified three-phase arrangement of the conductors.
Figure 16:
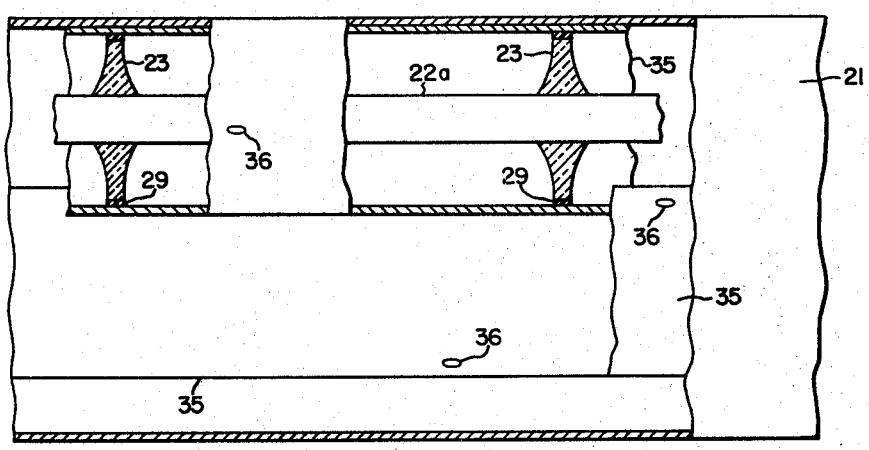
FIG. 16 is a view, in longitudinal section, taken along the line XVI–XVI in FIG. 15.

As previously stated, a separate pipe for each phase could also be used, but this has some disadvantages. The additional pipes provide zero-sequence current paths which cause additional heating. Also, the amount of pipe material is greater for three separate pipes in comparison to a single pipe containing the three phase conductors. The aforesaid heating losses can be reduced by utilizing the structure shown in FIGS. 15 and 16. The phase conductors 22a, 22b and 22c are each enclosed in a separate cylinder 35 of relatively lightweight conducting material which is directly connected to the outside pressure pipe 21, thereby making the three cylinders at ground potential. Since all three phases have a common return path, the losses associated with the high impedance return paths of separate pressure pipes for each phase are reduced.

Also, the three internal cylinders 35 each have holes or vents 36 therein of sufficient size and location to permit the free passage of the insulating medium, gas, oil, etc. The holes 36 are staggered between phases so as to preclude the possibility of a fault in one phase spreading to the other two phases. This results in a simplified insulator design, no clearance being required between the insulator disc and the conductor nor between the insulator and the surrounding cylinder since the holes in the cylinders permit free passage of the primary insulating medium. Thus, a simple disc insulator that is economical to build may be utilized.

As previously stated, faults will be confined to a single phase. The isolated phases with staggered vents will prevent single-phase faults from developing into line-to-line and three-phase faults. A single pressure pipe requires less material and less expense for installation than three separate pressure pipes.

Tests on the systems hereinbefore described indicate that it is quite important to make a good joint between the insulator and the conductor. With the insulator shaped as herein shown and epoxy or similar material attaching the insulator to the conductor, sparkover values approaching that of the same spacing without an insulator have been achieved. Without the seal, that is with the insulator lying loosely on the conductor, the sparkover value may be reduced as much as 75%. One of the difficulties encountered in attaching the disc insulator to the conductor arises from the fact that it is very difficult to get the filler material in place between the insulator and the conductor without the formation of small voids. Unless the voids are microscopic in size they will lead to eventual failure of the insulator.

Figure 11:
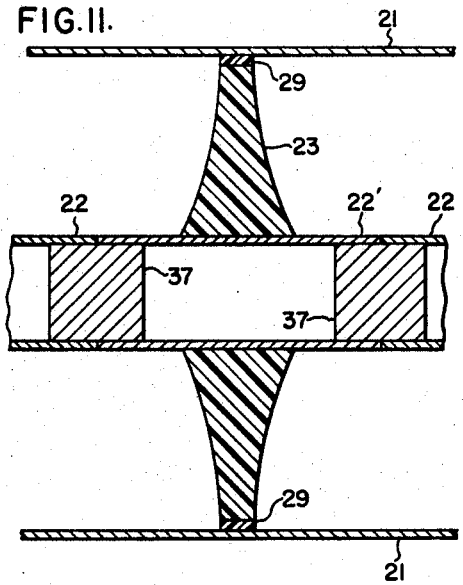
FIGS. 11 and 12 are views, in longitudinal section, of two different ways of attaching an insulator to a short section of conductor and connecting the short section between two other sections of conductor.

One way of avoiding this difficulty is to cast the insulator integrally around a short section of the conductor, assuming that the insulator is of plastic material, such as synthetic resin. The insulator and short section of the conductor may then be connected to two other sections of conductor in the manner shown in FIG. 11. Cylindrical metal members 37 may be pressed or welded inside the cylindrical conductor sections 22 and 22' to join the three sections together. The members 37 may be solid plugs or heavy hollow sleeves.

Figure 12:
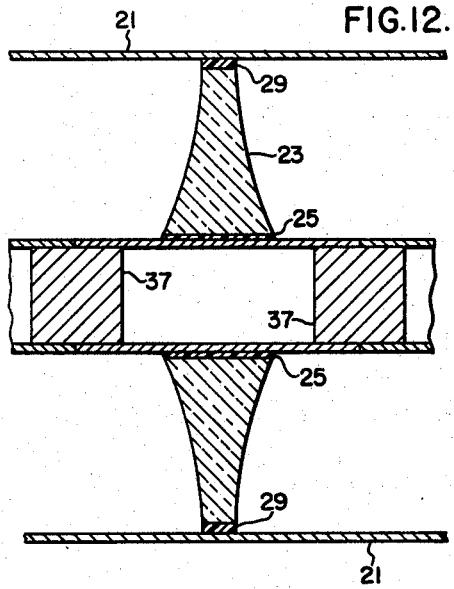
Figure 13:
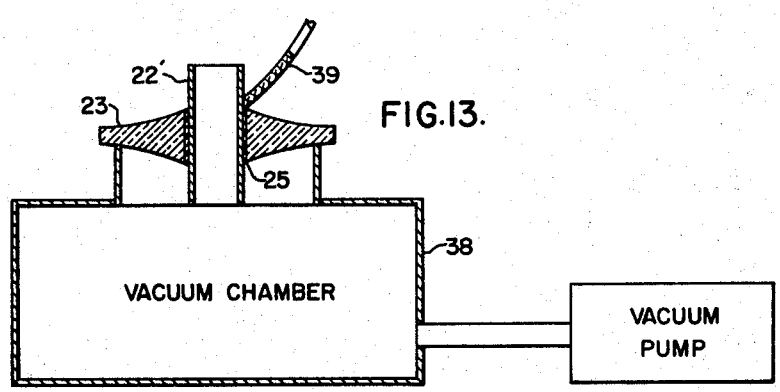
FIG. 13 is a diagrammatic view illustrating the method utilized to attach the insulator shown in FIG. 12.

If the insulator is made of porcelain or glass, as shown in FIG. 12, the filler material may be put into place by utilizing a vacuum chamber, as shown in FIG. 13, to make sure that no voids are present. By using a short piece of conductor 22' only a relatively small vacuum chamber 38 would be required. The filler material may be applied by means of a nozzle and hose 39 connected to a suitable supply tank (not shown). The thin rim of resilient conducting material 29, previously described, may be attached to the outer rim of the insulator 23 to improve the electrical and mechanical characteristics of the joint between the insulator and the wall of the pipe 21 as hereinbefore explained.

Figure 9:
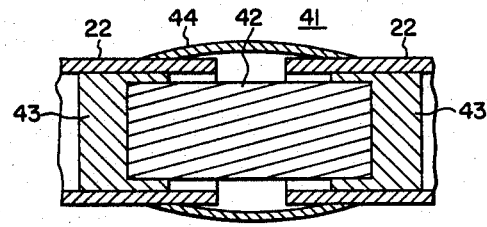
FIG. 9 is a view, in longitudinal section, of an expansion joint for a conductor.

Another problem that arises in the transmission of electric power by means of a conductor enclosed in a pipe is that of thermal expansion. In FIG. 9 a connector 41 functions to electrically connect two conductor sections 22 together and to permit expansion and contraction between the two conductor sections. The connector 41 comprises a section of stranded cable conductor 42 each end of which is secured in a generally cylindrical metal plug 43. The plugs 43 may be pressed into or welded in the ends of the conductor sections 22 with sufficient space between the ends of the two sections to permit expansion of the sections. The cable 42 has sufficient flexibility to permit expansion and contraction of the conductor sections. A corona shield 44 surrounds the joint between the two conductor sections.

Figure 10:
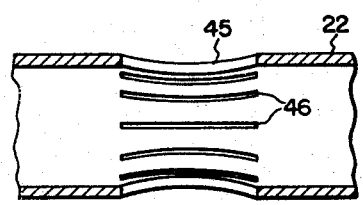
FIG. 10 is a view, in longitudinal section, of another way of taking care of expansion of the conductor.

Another method for taking care of expansion is shown in FIG. 10. An inwardly extending groove 45 is formed circumferentially around the hollow cylindrical conductor 22. A plurality of longitudinal slits 46 are provided in the groove 45. The slits 46 permit the conductor to flex inwardly as a result of expansion of the conductor.

Figure 14:
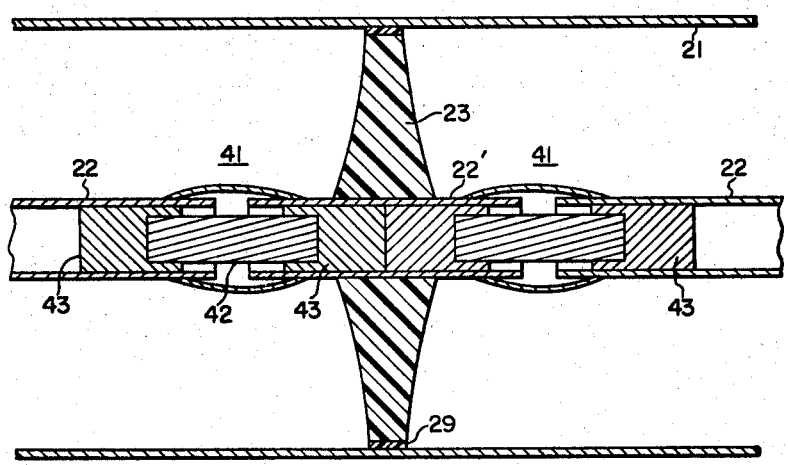
FIG. 14 is a view, in longitudinal section, of combined connecting and expansion joints.

As shown in FIG. 14, two expansible connectors 41 may be utilized to connect the short conductor section 22', with the insulator 23 attached thereto in the manner previously described, between two conductor sections 22 to permit expansion between the sections 22 and the short section 22'. Thus, by utilizing a connection of this type at predetermined locations along a transmission conductor thermal expansion of the conductor is permitted without injury to the conductor, or the enclosing pipe or housing.

From the foregoing description it is apparent that the invention provides a transmission system which is particularly suitable for carrying high voltage electric power and which can be installed either under ground or on top of the ground as desired. The system may be economically manufactured and installed and after it is installed it is not subject to the usual hazards encountered by aerial tranmsission systems.

Since numerous changes may be made in the above-described constructions and different embodiments of the invention may be made without departing from the spirit and scope thereof, it is intended that all subject matter contained in the foregoing description or shown in the accompanying drawings shall be interpreted as illustrative and not in a limiting sense.

I claim as my invention:

1. In an electric power transmission system, in combination, a generally cylindrical outer metal pipe, a conductor disposed inside the pipe, a plurality of disc-type insulators axially spaced along the conductor to support it in the pipe, resilient conducting material filling the space between the outer rim of each insulator and the pipe and closing off the axial ends of said space to prevent corona in said space at the joint between the insulator and the pipe, and said pipe containing a dielectric fluid under pressure.

2. Enclosed electric power transmission means comprising a metal outer pipe having circumferential outwardly extending grooves axially spaced along the pipe, a conductor disposed inside the pipe, a plurality of disc-type insulators axially spaced along the conductor for supporting it in the pipe, resilient conducting material attached to the outer rim of each insulator and filling the space between the rim and the pipe in one of said grooves, said resilient conducting material closing off the axial ends of said space between the rim and the pipe to prevent corona in said space and said pipe containing an insulating fluid under pressure.

3. Enclosed electric power transmission means comprising a metal outer pipe having circumferential outwardly extending grooves spaced along the pipe, a conductor disposed inside the pipe, a plurality of disc-type insulators axially spaced along the conductor for supporting it in the pipe, a generally semi-circular spring attached to the outer rim of each insulator and disposed in one of said grooves to close off the axial ends of the space between the outer rim and the pipe to thereby prevent corona in said space, and said pipe containing an insulating fluid under pressure.

4. Enclosed electric power transmission means comprising a generally cylindrical outer metal pipe, a generally cylindrical conductor disposed inside the pipe, a plurality of disc-type insulators axially spaced along the conductor for supporting it in the pipe, resilient metal rings disposed between each insulator and the conductor and between the insulator and the pipe, said rings closing off the axial ends of the spaces between said insulator and said conductor and said pipe, respectively, to thereby prevent corona in said spaces, each ring having a recess therein for receiving the insulator, and said pipe containing an insulating fluid under pressure.

References Cited

UNITED STATES PATENTS

| | | | |
|---|---|---|---|
| Re. 20,244 | 1/1937 | Peterson | 174—28 |
| 409,181 | 8/1889 | De Ferranti | 174—88 |
| 1,795,939 | 3/1931 | Estorff | 174—111 |
| 2,000,679 | 5/1935 | Walter | 174—28 |
| 2,044,580 | 6/1936 | Leach | 174—28 |
| 2,067,967 | 1/1937 | Kniepen | 174—127 |
| 2,082,860 | 6/1937 | Walter | 174—28 |
| 2,173,717 | 9/1939 | Hobart | 174—28 |
| 2,274,031 | 2/1942 | Bannon | 174—37 |
| 2,347,912 | 5/1944 | Komives | |
| 2,355,111 | 8/1944 | Rouault | 174—28 |
| 2,351,520 | 6/1944 | Katzin et al. | 174—28 |
| 2,795,397 | 6/1944 | Hull et al. | 285—138 |
| 2,927,953 | 3/1960 | Staller | 339—9 |

FOREIGN PATENTS

| | | |
|---|---|---|
| 856,241 | 3/1940 | France. |
| 1,136,621 | 12/1956 | France. |
| 835,465 | 3/1952 | Germany. |
| 934,898 | 11/1955 | Germany. |
| 955,792 | 1/1957 | Germany. |
| 397,081 | 8/1933 | Great Britain. |

OTHER REFERENCES 1,092,982 German Printed Application, November 1960, Sunderhauf et al. 174–22.

DARRELL L. CLAY, *Primary Examiner.*

A. T. GRIMLEY, H. HUBERFELD,
*Assistant Examiners.*